United States Patent
Martin

(10) Patent No.: US 10,583,498 B1
(45) Date of Patent: Mar. 10, 2020

(54) APPARATUS FOR RETAINING A WORKPIECE

(71) Applicant: Honda Motor Co., Ltd., Tokyo (JP)

(72) Inventor: Jeffrey D. Martin, Troy, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/208,784

(22) Filed: Dec. 4, 2018

(51) Int. Cl.
  *B23B 31/40* (2006.01)
  *B23Q 1/00* (2006.01)
  *B23Q 3/06* (2006.01)
  *B23B 31/20* (2006.01)

(52) U.S. Cl.
  CPC .......... *B23B 31/4033* (2013.01); *B23Q 1/009* (2013.01); *B23Q 3/06* (2013.01); *B23B 31/207* (2013.01); *B23B 31/4006* (2013.01); *B23Q 2703/06* (2013.01); *Y10T 279/1012* (2015.01); *Y10T 279/1045* (2015.01)

(58) Field of Classification Search
  CPC ........... B23B 31/4033; B23B 31/4006; B23B 31/4026; B23B 31/404; B23B 31/406; B23B 31/4066; B23B 31/207; B23Q 3/067; B23Q 3/06; B23Q 1/009; B23Q 2703/06; Y10T 279/1004; Y10T 279/1012; Y10T 279/17821; Y10T 279/1045; Y10T 279/1087
  See application file for complete search history.

(56) References Cited

U.S. PATENT DOCUMENTS

| | | | | |
|---|---|---|---|---|
| 4,804,301 A | * | 2/1989 | Hunt | B23B 31/1074 279/87 |
| 5,806,859 A | * | 9/1998 | Saccomanno, III | B23B 31/207 279/143 |
| 6,502,834 B1 | * | 1/2003 | Fukui | B23B 31/201 279/156 |
| 7,287,940 B2 | * | 10/2007 | Feldmeier | B23B 31/28 408/239 R |

(Continued)

FOREIGN PATENT DOCUMENTS

| | | |
|---|---|---|
| CN | 206779496 U | 12/2017 |
| DE | 102016110973 A1 | 12/2017 |

(Continued)

*Primary Examiner* — Eric A. Gates
*Assistant Examiner* — Chwen-Wei Su
(74) *Attorney, Agent, or Firm* — Kenealy Vaidya LLP

(57) ABSTRACT

An expanding collet device can selectively clamp a workpiece to a workpiece support and can include an arbor, expandable collet and threaded screw actuator. The threaded screw actuator mechanism can include a support, drawbar, socket and a pair of thrust bearings. The drawbar can be connected to the collet and can extend into the support. An outer circumferential portion of the drawbar can oppose and be spaced away from an inner circumferential portion of the support. The socket can surround the drawbar and can include external threads engaging internal threads on the support such that rotation of the socket relative to the support displaces the socket in the axial direction. The socket, support, and drawbar can be configured such that rotation of the socket relative to the support displaces the drawbar in the axial direction such that the drawbar moves the collet between the released position the clamped position.

20 Claims, 5 Drawing Sheets

(56) References Cited

U.S. PATENT DOCUMENTS

| | | | |
|---|---|---|---|
| 8,752,281 B2 | 6/2014 | Hangleiter et al. | |
| 9,782,833 B2 * | 10/2017 | Tan | B23B 31/204 |
| 10,010,946 B2 | 7/2018 | Martin | |
| 2013/0147131 A1 | 6/2013 | Mitchell | |
| 2017/0050246 A1 | 2/2017 | Shi et al. | |

FOREIGN PATENT DOCUMENTS

| | | | | |
|---|---|---|---|---|
| GB | 305907 A * | 2/1929 | | B23B 31/207 |
| JP | 2001121326 A | 5/2001 | | |
| JP | 4471531 B2 | 6/2010 | | |

\* cited by examiner

APPARATUS FOR RETAINING A WORKPIECE

BACKGROUND

The disclosed subject matter relates to apparatus for retaining a workpiece, and methods of use and manufacture thereof. More particularly, the disclosed subject matter relates to methods and apparatus that secure a workpiece in place, such as in the contexts of pallet clamps, robot fingers, CNC tombstone jigs, general work holding and handling devices, etc.

It may be beneficial or necessary in many different contexts to hold a physical component or element (hereinafter "workpiece") in place. For example, a workpiece can be held in place on another object, such as on a pallet, to facilitate transportation of the object from one location or orientation to another. The workpiece may need to be held in place, i.e., immobile relative to the pallet, so that the workpiece can be subjected to a separate operation at each of the locations and/or orientations.

In the context of manufacturing, the workpiece can be repeatedly and precisely indexed and held in place on a pallet for a machining or assembly operation. In some situations, such as where the workpiece is an engine cylinder head, the workpiece may be held in a predefined position and orientation, while being subjected to machining processes and forces (e.g., cutting, drilling, welding, fixing, centrifugal forces, vibrational forces, etc.).

SUMMARY

Some embodiments are directed to an expanding collet device for selectively clamping a workpiece to a workpiece support, the expanding collet device can include an arbor, a collet and a threaded screw actuator. The arbor can be configured to be fixed to the workpiece support and can include an outer surface. The collet can be located adjacent the outer surface of the arbor and movable relative to the outer surface of the arbor in an axial direction between a released position and a clamped position such that the collet expands in a radial direction perpendicular to the axial direction when the collet moves toward the clamped position and the collet contracts in the radial direction when the collet moves toward the released position. The threaded screw actuator mechanism can include a support, a drawbar, a socket, a first thrust bearing and a second thrust bearing. The support can be fixed to the arbor. The support can include a hollow passage extending through the support in the axial direction. The hollow passage can include a first inner circumferential portion that includes internal threads and a second inner circumferential portion. The drawbar can be connected to the collet. The drawbar can extend into the hollow passage. The drawbar can have a first outer circumferential portion and a second outer circumferential portion. The second outer circumferential portion can oppose and be spaced away from the second inner circumferential portion of the support. The socket can surround the first outer circumferential portion of the drawbar and terminate at first and second ends. The socket can include external threads engaging the internal threads on the first inner circumferential portion of the support such that rotation of the socket relative to the support displaces the socket in the axial direction. The first thrust bearing can rotatably support the first end of the socket on the drawbar to permit the socket to rotate relative to the drawbar. The second thrust bearing can rotatably support the second end of the socket on the drawbar to permit the socket to rotate relative to the drawbar. The socket, support, and drawbar can be configured such that rotation of the socket in a first direction relative to the support displaces the drawbar in the axial direction such that the drawbar moves the collet toward the released position and rotation of the socket in a second direction different from the first direction and relative to the support displaces the drawbar in the axial direction such that the drawbar moves the collet toward the clamped position.

Some embodiments are directed to a collet clamp assembly that can include an arbor, a collet and a threaded screw actuator. The arbor can be configured to be fixed to a workpiece support and can include an outer surface. The collet can be located adjacent the outer surface of the arbor and configured to move relative to the outer surface of the arbor in an axial direction between a released position and a clamped position such that the collet expands in a radial direction perpendicular to the axial direction when the collet moves toward the clamped position and the collet contracts in the radial direction when the collet moves toward the released position. The threaded screw actuator mechanism can include a support, a drawbar, a socket, a first thrust bearing and a second thrust bearing. The support can be fixed to the arbor. The support can include a hollow passage extending through the support in the axial direction. The hollow passage can include a first inner circumferential portion that includes internal threads and a second inner circumferential portion that is a smooth cylindrical inner surface. The drawbar can be connected to the collet and extend into the hollow passage. The drawbar can have a first outer circumferential portion and a second outer circumferential portion. The second outer circumferential portion can be a smooth cylindrical outer surface that opposes the smooth cylindrical inner surface of the second inner circumferential portion of the support. The socket can surround the first outer circumferential portion of the drawbar and terminate at first and second ends. The socket can include external threads engaging the internal threads on the first inner circumferential portion of the support such that rotation of the socket relative to the support displaces the socket in the axial direction. The first thrust bearing can rotatably support the first end of the socket on the drawbar to allow the socket to rotate relative to the drawbar. The second thrust bearing can rotatably support the second end of the socket on the drawbar to allow the socket to rotate relative to the drawbar. The socket, support, and drawbar can be configured such that rotation of the socket in a first direction relative to the support displaces the drawbar in the axial direction such that the drawbar moves the collet toward the released position and rotation of the socket in a second direction different from the first direction and relative to the support displaces the drawbar in the axial direction such that the drawbar moves the collet toward the clamped position.

Some embodiments are directed to a pallet assembly for removably securing a workpiece, the pallet assembly can include a workpiece pallet and at least one collet clamp assembly. The workpiece pallet can include a mounting surface, at least one recess, and at least one mounting hole adjacent to the recess. The collet clamp assembly can be configured to selectively clamp a workpiece to the workpiece pallet. The collet clamp assembly can include an arbor, a collet and a threaded screw actuator mechanism. The arbor can be connected to the workpiece pallet and can include an outer surface. The collet can be located adjacent on the outer surface of the arbor and movable relative to the outer surface of the arbor in an axial direction between a released position and a clamped position such that the collet expands in a radial direction perpendicular to the axial direction when the collet moves toward the clamped position and the collet contracts in the radial direction when the collet moves toward the released position. The threaded screw actuator mechanism can extend into recess and can include a support, a drawbar, a socket, a first thrust bearing and a second thrust bearing. The support can be fixed to the arbor and include a hollow passage extending through the support in the axial direction. The hollow passage can include a first inner circumferential portion that includes internal threads and a second inner circumferential portion. The drawbar can be connected to the collet and extend into the hollow passage. The drawbar can have a first outer circumferential portion and a second outer circumferential portion. The second outer circumferential portion can oppose and be spaced away from the second inner circumferential portion of the support. The socket can surround the first outer circumferential portion of the drawbar and terminate at first and second ends. The socket can include external threads engaging the internal threads on the first inner circumferential portion of the support such that rotation of the socket relative to the support displaces the socket in the axial direction. The first thrust bearing can rotatably support the first end of the socket on the drawbar to allow the socket to rotate relative to the drawbar. The second thrust bearing can rotatably support the second end of the socket on the drawbar to allow the socket to rotate relative to the drawbar. The socket, support, and drawbar can be configured such that rotation of the socket in a first direction relative to the support displaces the drawbar in the axial direction such that the drawbar moves the collet toward the released position and rotation of the socket in a second direction different from the first direction and relative to the support displaces the drawbar in the axial direction such that the drawbar moves the collet toward the clamped position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
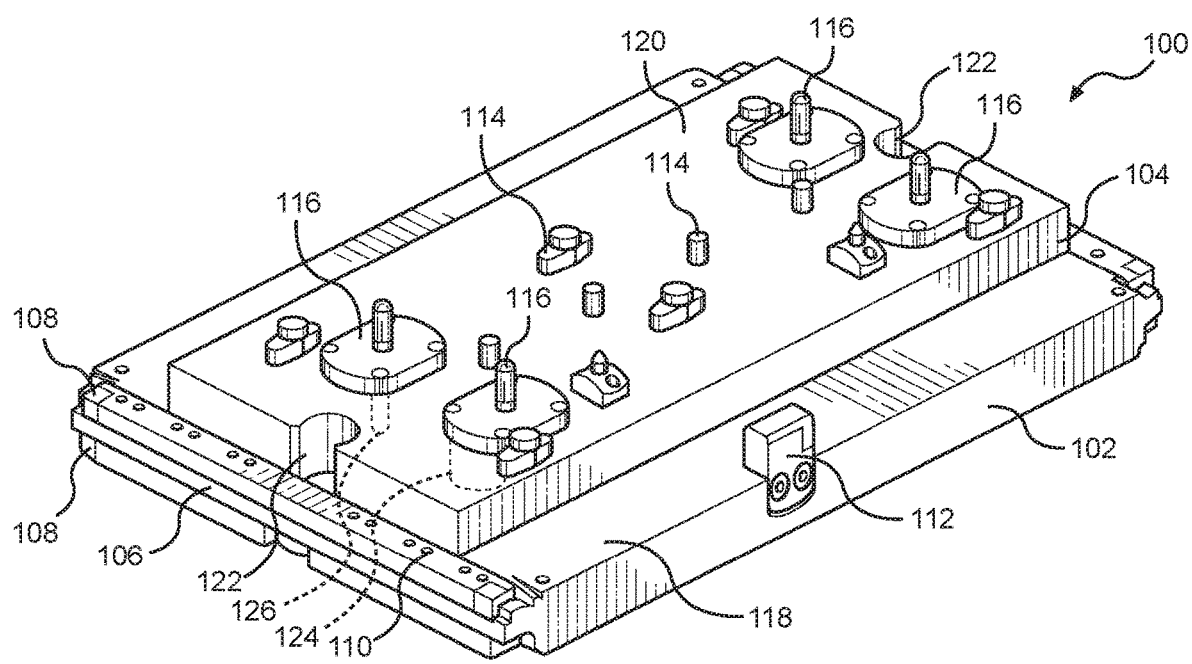
FIG. 1 is a perspective view of exemplary collet clamp assemblies installed within a workpiece pallet in accordance with the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Work-holding devices can typically be indexed into three different layouts: swinging clamps (such as those configured to be maneuvered on a hydraulically driven pivoting clamp), collet clamps, and mandrel style clamp mechanisms. Each of these work-holding device layouts can be subject to advantage(s) and disadvantage(s) as compared to the other layouts, and can be selected based on performance, maintenance, cost and/or any other appropriate targets set for a particular workpiece.

Related art work-holding solutions exist in lathe-chucking applications for internal chucking of a workpiece. Some expanding collet assemblies can include an arbor flanged portion for securing the collet assembly to a machine tool spindle. In such a layout, a shaft portion of the arbor, which receives the collet sleeve, is concentric with the machine tool spindle. The spindle cooperates with a centering device, such as a tapered recess on the arbor, to align the spindle with a draw bar that actuates the collet. Axial movement of the draw bar is achieved by hydraulic or pneumatic actuation of the machine tool spindle in the axial direction of the draw bar. However, the precision in which hydraulic or pneumatic actuation drives the mandrel can be insufficient for one or more workpiece holding specifications.

Different work locating stops, which can be configured as sleeve members that are each removably secured to a flange portion of the arbor, can be used to engage the collet assembly with different workpieces. The work locating stop is disposed around a collet with space to enable the expanding collet to expand when actuated to grip the workpiece. During a clamping process, the collet can move the workpiece towards the machine tool spindle, in effect pulling the workpiece towards the collet assembly. The work location stop can prevent or impede the workpiece pulling effect because the work location stop provides a repeatable and accurate reference surface against which the workpiece abuts.

Other work-holding solutions can utilize a serrated mandrel that expands and bites into work hole walls of a workpiece. However, expansion of the serrated mandrel can damage the workpiece, such as by scratching and scarring the workpiece. The control mechanism that causes the expansion of the mandrel or the collet may include a hydraulic or pneumatic drive, which actuation may not be sufficiently accurate where a precise locating of the mandrel or collet is desired.

Related art work-holding devices may be subject to other disadvantages. For example, various components may only be suitable for use in chucking of lathes or other machining tools. In particular, one or more components of a hydraulically-driven collet for chucking tools can be incompatible with: workpiece orientation, a need for securing a workpiece without the use of a locating work stop, work hole configurations utilized in a workpiece pallet in a machining or assembly station, etc. With regard to swing arm mechanisms, interference with machining processes is often a problematic issue that results in disadvantageous design characteristics.

Expanding collets assemblies 116 come in several basic designs. Each of these designs shares a means to expand or contract a collet 312 to increase or decrease an outer diameter of the collet 312 (thus providing the collet's gripping functionality). Typically a drawbar 316 fixed to an axial centerline will either advance or retract, and in doing so will compress or relax the collet. A hydraulic cylinder, air cylinder, or springs, can be used to achieve the necessary axial force for axial advancing or retracting of the drawbar 316. Hydraulic or air sources require additional means to supply, transport and hold that power distribution system.

The disclosed subject matter includes a method and associated structure for compressing and relaxing the collet 312 in an automated manner that uses a socket and driver motor. The design utilizes screw rotation technology to both expand and contract the collet 312. The disclosed system structures and associated methods apply the torque necessary to apply the desired clamping forces, which can be extreme, applied by the collet 312 on the workpiece 200 in an automated fashion. In particular, an expanding collet 312 can be constrained axially (but allowed to float) to a drawbar 316 feature that is either extended or retracted along that same axis. The "pushing/pulling" action provides the compressing or relaxing of the collet 312. When the screw actuator is rotated clockwise or counterclockwise, it causes the drawbar 316 to move linearly along a centerline axis, thus retracting or expanding the collet 312. In addition, the mechanical advantage inherent to screw torque provides an easy means to achieve the desired clamping forces for collet 312 expansion/contraction.

It may therefore be beneficial to provide a work-holding mechanism that addresses at least one of the above and/or other disadvantages of the related art. For example, it may be beneficial to provide a workpiece holding mechanism that: does not involve swinging clamps (and their resultant interference with manufacturing processes); reduces, impedes or avoids damaging the workpiece; is generally compatible with different operations, and provides an efficient, simple and repeatable manner for connection between a clamp assembly and the workpiece.

I. Workpiece Pallet

Figure 2:
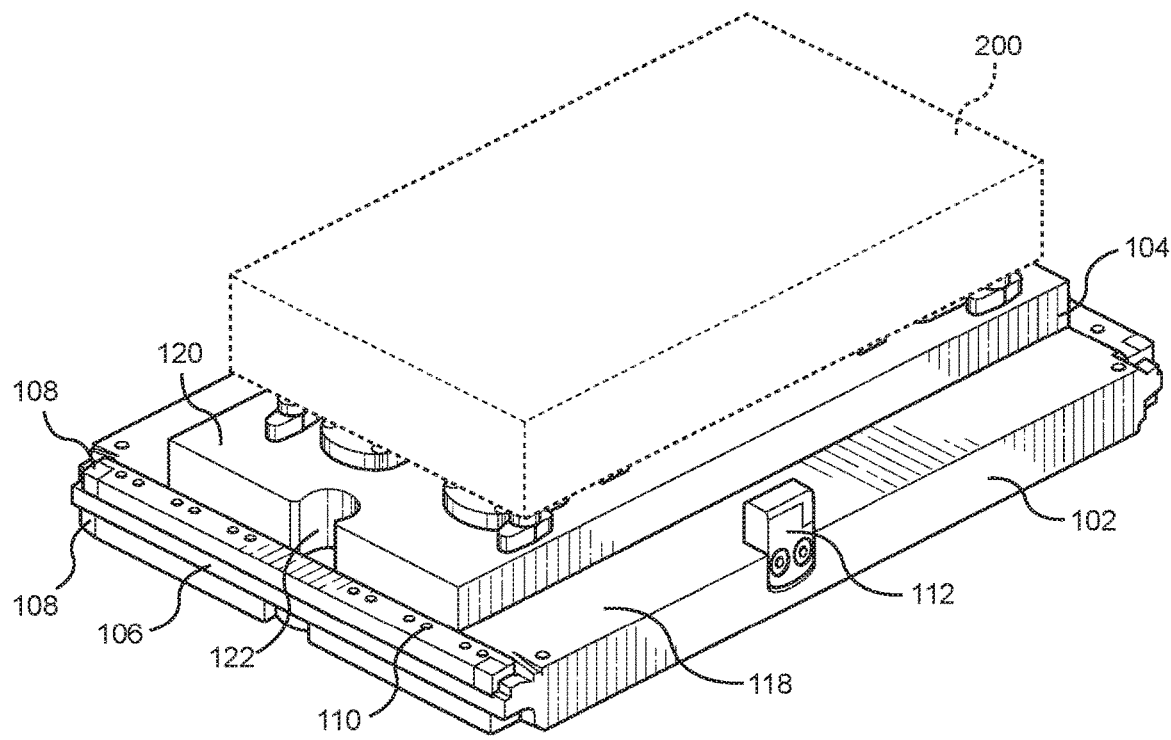
FIG. 2 is a perspective view of a workpiece mounted on the workpiece pallet of FIG. 1.

FIG. 1 is a perspective view of exemplary collet clamp assemblies installed in a workpiece pallet 100 made in accordance with principles of the disclosed subject matter; and FIG. 2 is a perspective view of a workpiece 200 (e.g., article of manufacture, such as an engine cylinder head) mounted on the workpiece pallet 100 of FIG. 1. The workpiece pallet 100 can include a conveying portion 102 and a workpiece portion 104. The workpiece portion 104 can be connected or secured to a mounting surface 118 of the conveying portion 102 in any appropriate manner, such as but not limited to mechanical fasteners, magnets, slides, glue, epoxy, welding, pressure fitting, etc., or can be made as a single integral unit.

The conveying portion 102 itself can be formed as a unitary or multi-part body, and be configured in any appropriate shape that can support the workpiece portion 104 and the workpiece 200, such as at a machining station and/or during transport between different machining stations in a manufacturing transfer system. The conveying portion 102 can include end flange portions 106, transfer rails 108, attachment points 110, and a peripheral extension piece 112. Each lateral end of the conveying portion 102 can include an end flange portion 106 of identical size, extending a partial or entire width of the conveying portion 102. A transfer rail 108 can be mounted onto each upper and lower face of each end flange portion 106. Each transfer rail 108 can extend a partial or entire length of the end flange portion 106. In order to facilitate precise indexing of the workpiece pallet 100 into machining positions, a peripheral extension piece 112 can be located on a side of conveying pallet 102. Additionally, attachment points 110 can be formed in the transfer rails 108 for receiving locating pins or other locating apparatus at a machining station and/or to aid with motion during transfer between machining stations.

The workpiece portion 104 can be formed as a unitary or multi-part body, and be configured in any appropriate shape that can support the workpiece 200, such as at a machining station and/or during transport between different machining stations in a manufacturing transfer system. The workpiece portion 104 can include mounting fixtures 114, one or more grooves 122, and one or more collet clamp assemblies 116. The one or more grooves 122 can be provided in workpiece portion 104 for indexing the workpiece pallet 100 into machining positions or to accommodate transport between different machining stations. A mounting surface 120 can be provided with one or more mounting fixtures 114 that are arranged in any manner for supporting mounting points on the workpiece 200. The workpiece portion mounting surface 120 can also include one or more collet clamp assemblies 116 arranged in any appropriate locations that correspond to work holes in workpiece 200. For example, the collet clamp assembly 116 locations can conform to a pattern that distributes the weight of the workpiece 200 across the workpiece pallet 100. As described in more detail below, each collet clamp assembly 116 can attach to the workpiece pallet 100 in any appropriate manner, such as but not limited to mechanical fasteners, glue, epoxy, welding, magnets, pressure fitting, etc.

The workpiece pallet 100 can include at least one recess 124 in mounting surface 120 and at least mounting hole 126 that is adjacent to the recess 124. The recess 124 receives a portion of collet clamp assembly 116. As will be described in further detail below, a threaded fastener can pass through a portion of the collet clamp assembly 116 and thread into the mounting hole 126. In the exemplary embodiment of FIG. 1, the workpiece pallet 100 includes four recesses 124, one for each of the collet clamp assemblies 116. However, the workpiece pallet 100 can include any appropriate number of recesses 124. Further, in the exemplary embodiment of FIG. 1, the workpiece pallet 100 can include four mounting holes 126 spaced around each recess 124. However, the workpiece pallet 100 can include any appropriate number of mounting holes 126.

The workpiece 200 can be any article that can be secured in a machining position and moved between assembly and/or machining stations as part of a manufacturing transfer system. In an embodiment, the workpiece 200 can include an engine block or an engine cylinder head or portions thereof that can be mounted onto workpiece pallet 100. Other workpieces 200 can include any article of manufacture that can be secured onto the workpiece portion 104 by collet clamp assembly 116.

Exemplary embodiments of the disclosed subject matter also include a workpiece support structure that is different from the workpiece pallet 100. For example, the collet clamp assembly 116 can be mounted on a jig, a frame, or other structure such that the collet clamp assembly 116 holds and spins the workpiece 200 relative to a cutting tool of a lathe.

II. Collet Clamp Assembly

Figure 3:
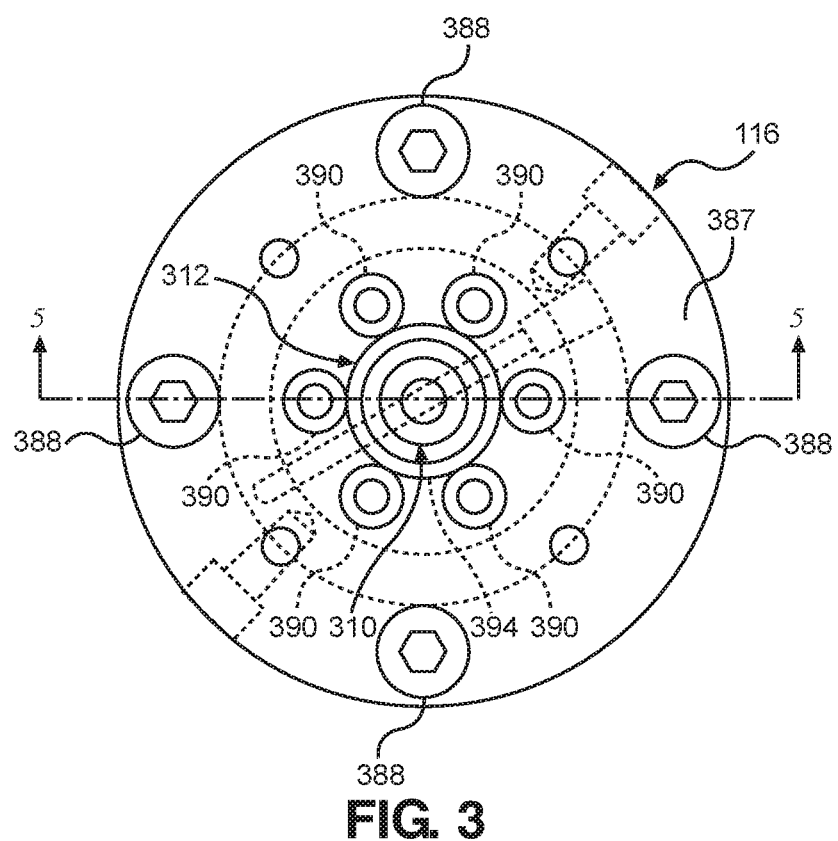
FIG. 3 is a top plan view of an exemplary collet clamp assembly of FIG. 1.
Figure 4:
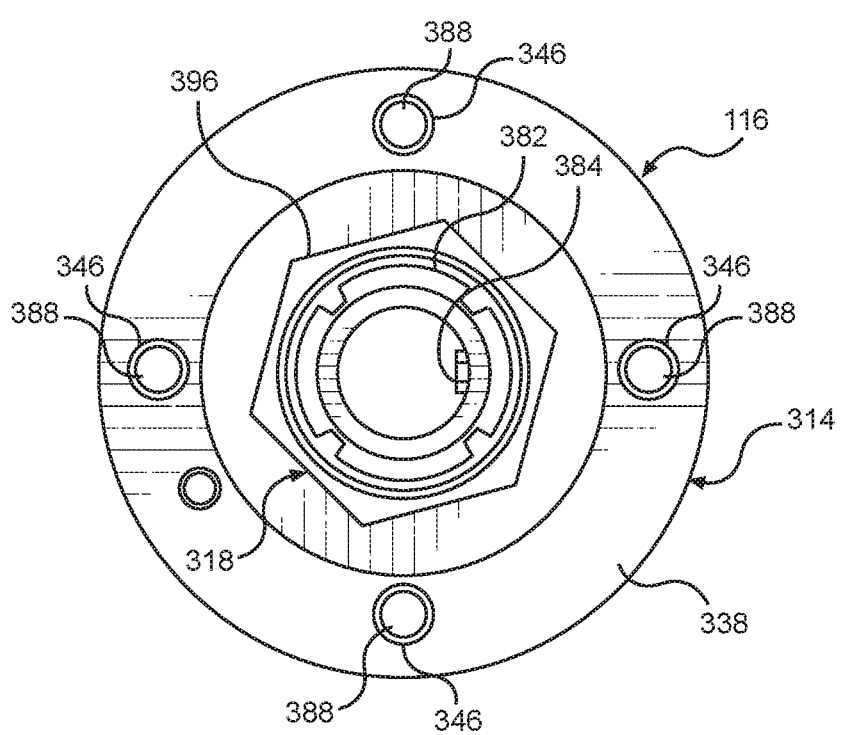
FIG. 4 is a bottom plan view of the exemplary collet clamp assembly of FIG. 3.
Figure 5:
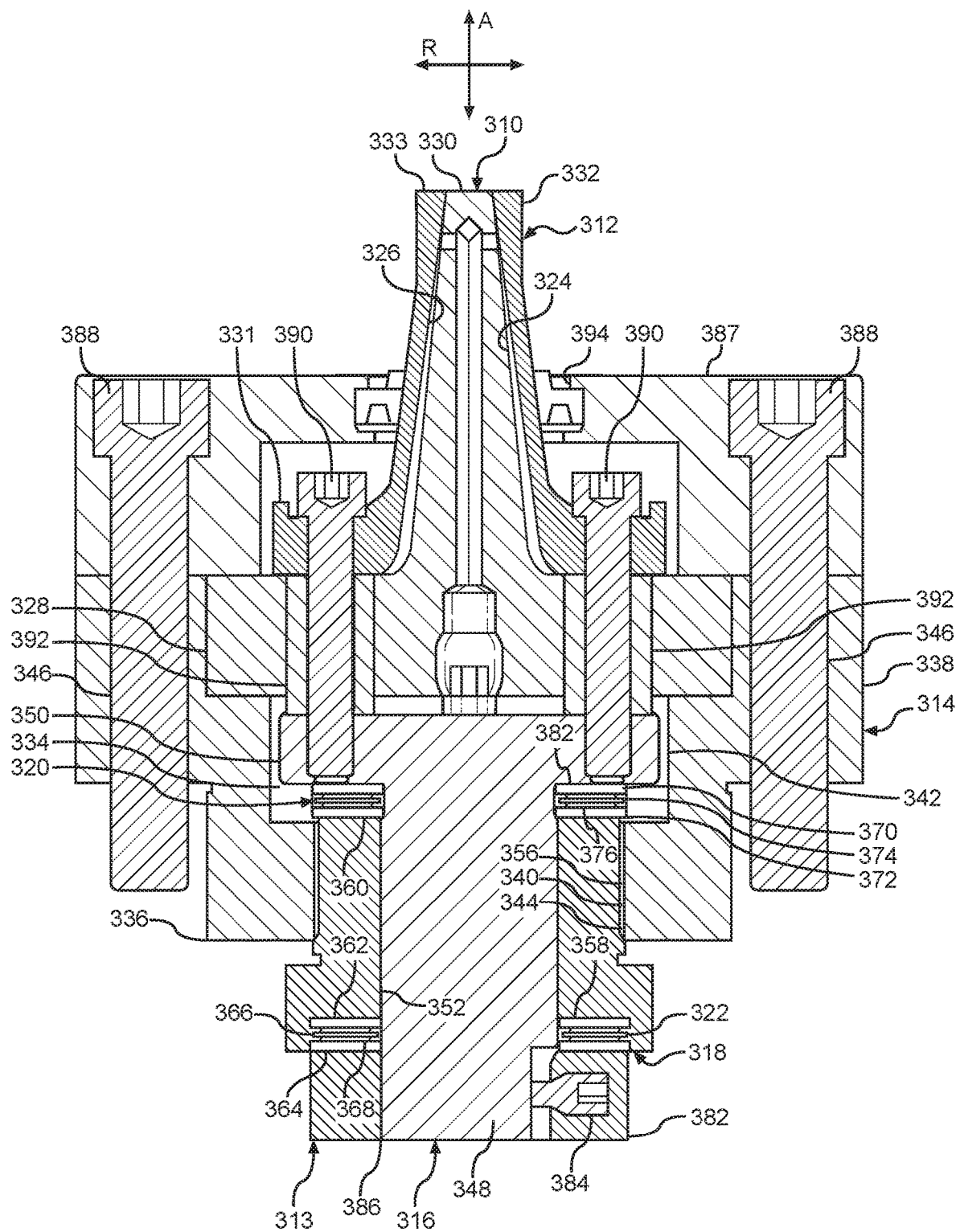
FIG. 5 is cross-sectional view of the exemplary collet clamp assembly of FIG. 1 taken along line 5-5 of FIG. 3.

Referring to FIGS. 3-5, an exemplary collet clamp assembly 116 can have a generally cylindrical shape. The collet clamp assembly 116 can include an arbor 310, a collet 312 and a threaded screw actuator mechanism 313.

Figure 7:
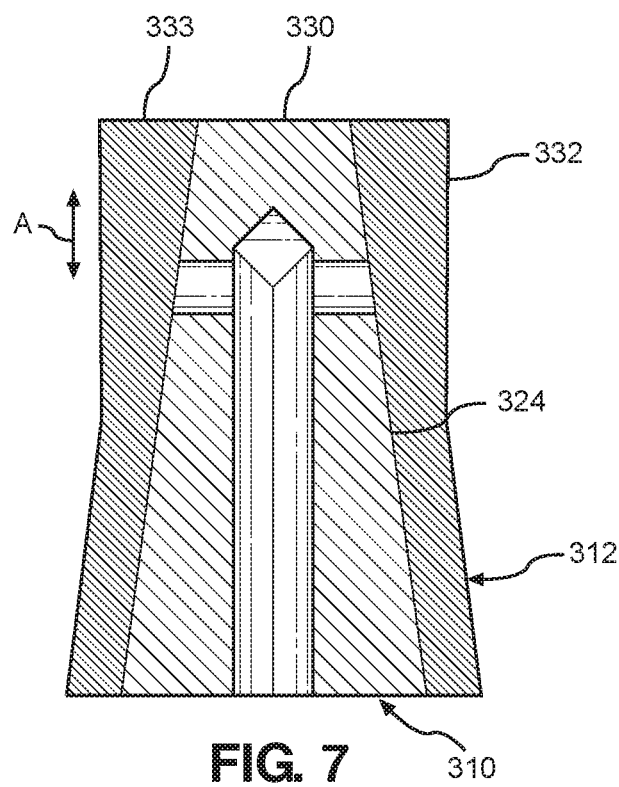
FIG. 7 is an enlarged view an upper portion of the exemplary collet clamp assembly of FIG. 5, and shows the collet in the clamped position.
Figure 8:
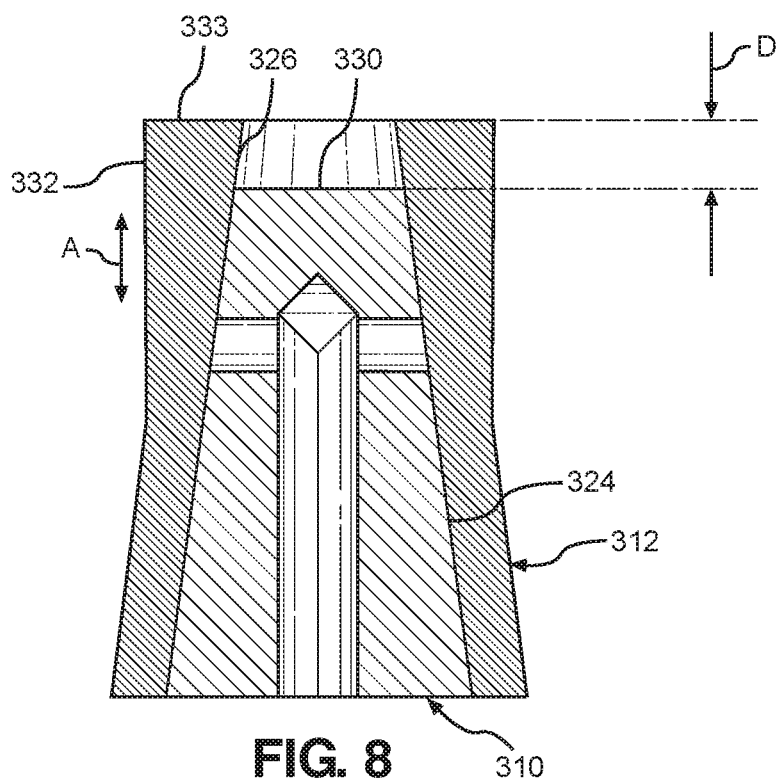
FIG. 8 is an enlarged view the upper portion of the exemplary collet clamp assembly of FIG. 5, and shows the collet in the released position.

Referring to FIGS. 5, 7 and 8, the arbor 310 can include an outer surface 324. The outer surface 324 can movably support the collet 312 such that the collet 312 moves in an axial direction A between a released position and a clamped position. FIG. 7 shows the collet 312 in the clamped position and FIG. 8 shows the collet 312 in the released position. Referring to FIGS. 5, 7 and 8, the collet 312 can include an inner surface 326. The inner surface 326 can slide along the outer surface 324 of the arbor 310 as the collet 312 moves between the released position and the clamped position. The outer surface 324 and the inner surface 326 can be configured to cause the collet 312 to expand in a radial direction R when the collet 312 moves toward the clamped position and contracts in the radial direction R when the collet 312 moves in toward the released position. For example, the outer surface 324 can have a conical shape that tapers from a base 328 of the arbor 310 to an end 330 of the arbor 310, and the inner surface 326 can have conical surface that tapers from a base 331 to an end 333 of the collet 312. The base 328 of the arbor 310 can be a flange. The base 331 of the collet 312 can be a flange.

The threaded screw actuator mechanism 313 can include a support 314, a drawbar 316, a socket 318, a first thrust bearing 320 and a second thrust bearing 322. The collet 312 can include a gripping surface 332. The gripping surface 332 can be cylindrical. The gripping surface 332 can expand and contract as the collet 312 moves toward and away from the clamping position and can extend into a bore in the workpiece 200. When the collet 312 is in the clamped position, the gripping surface 332 can frictionally engage the inner surface of the bore of the workpiece, thereby releasably and selectively clamping the workpiece 200 to the workpiece pallet 100.

As will be described in detail below, rotation of the socket 318 in a first direction relative to the support 314 can displace the drawbar 316 in the axial direction A such that the drawbar 316 moves the collet 312 toward the released position and rotation of the socket 318 in a second direction relative to the support 314 can displace the drawbar 316 in the axial direction A such that the drawbar 316 moves the collet 312 toward the clamped position.

Referring to FIGS. 4 and 5, a support 314 can be fixed to the arbor 310. The support 314 can include a hollow passage 334, a first cylindrical portion 336 and a second cylindrical portion 338. At least a portion of first cylindrical portion 336 can extend into the recess 124 in the mounting surface 120 of the workpiece pallet 100. The second cylindrical portion 338 can extend across the mounting surface 120 of the workpiece pallet 100. The second cylindrical portion 338 can include at least one support mounting 346 hole that is aligned with the mounting hole 126 in the workpiece pallet 100. In the exemplary embodiment of FIGS. 1-6, the second cylindrical portion 338 can include four support mounting holes 346 that are equally spaced about the second cylindrical portion 338.

The hollow passage 334 can pass through the first cylindrical portion 336 and the second cylindrical portion 338. The hollow passage 334 can include a first inner circumferential portion 340 and a second inner circumferential portion 342. The first inner circumferential portion 340 can be in the first cylindrical portion 336. The second inner circumferential portion 342 can be in the second cylindrical portion 338. The second inner circumferential portion 342 can be a smooth cylindrical inner surface or a continuously smooth cylindrical inner surface. The first inner circumferential portion 340 can include internal threads 344.

The drawbar 316 can be connected to the collet 312 and can extend into the hollow passage 334. The drawbar 316 can also include a main body 348, a flange 350, a first outer circumferential portion 352 and a second outer circumferential portion 354. The main body 348 can include a first outer circumferential portion 352 and the flange 350 can include the second outer circumferential portion 354. The first outer circumferential portion 352 can be concentric with the first inner circumferential portion 340 of the support 314.

The second outer circumferential portion 354 can oppose and be spaced away from the second inner circumferential portion 342 of the support 314. The second outer circumferential portion 354 can be a smooth cylindrical outer surface, or a continuously smooth cylindrical outer surface, that opposes the smooth cylindrical inner surface of the second inner circumferential portion 342 of the support 314. The second outer circumferential portion 354 can be concentric with the second inner circumferential portion 342 of the support 314.

The socket 318 can surround the first outer circumferential portion 352 of the drawbar 316. The socket 318 can terminate at first and second ends 358, 360. The socket 318 can include external threads 356 engaging the internal threads 344 on the first inner circumferential portion 340 of the support 314 such that rotation of the socket 318 relative to the support 314 displaces the socket 316 in the axial direction A. As will be explained in further detail below, the drawbar 316 can move in the axial direction A with the socket 318.

Figure 6:
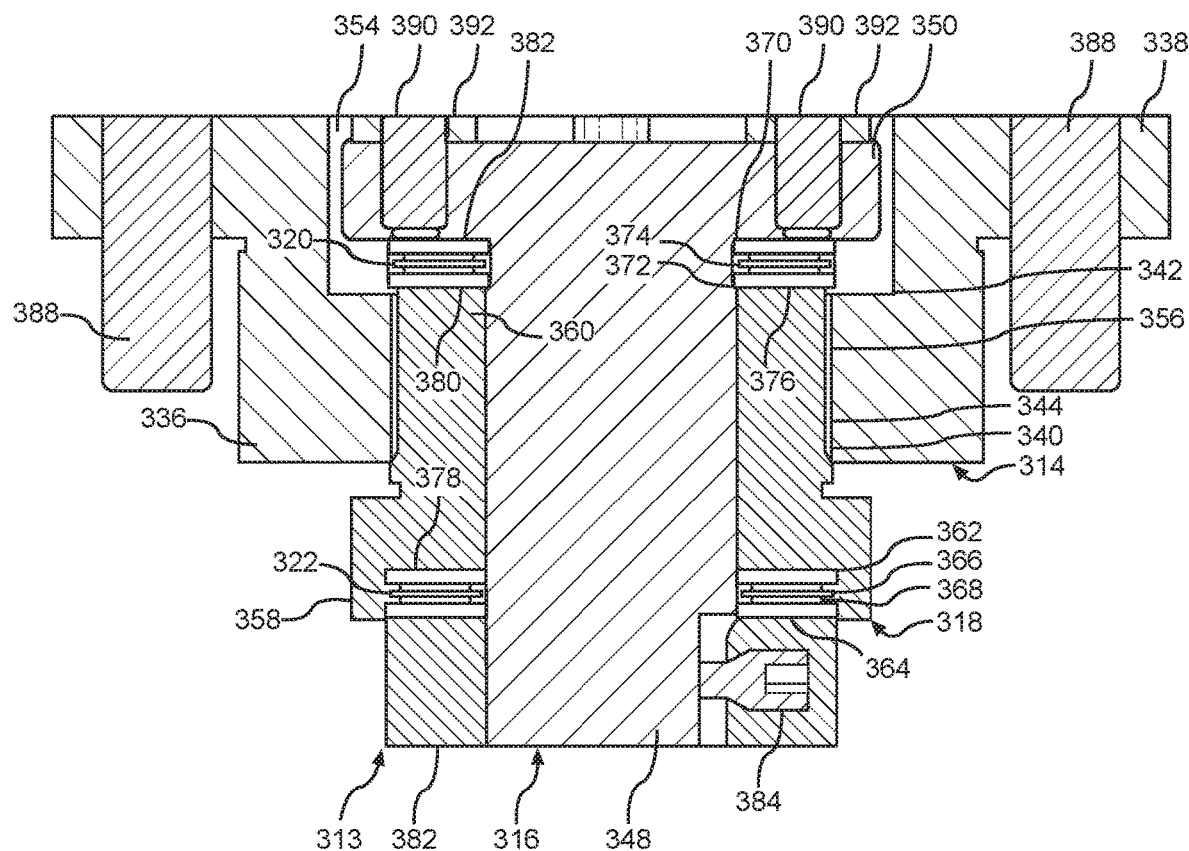
FIG. 6 is an enlarged view of a lower portion of the exemplary collet clamp assembly of FIG. 5.

Referring to FIGS. 4-6, the socket 318 can include a drive hex 396 at the first end 358 of the socket 318. The drive hex 396 can have a hexagonal outer perimeter that can be selectively engaged by a rotary power tool or by a hand tool such that the rotary power tool or the hand tool can rotate the socket 318.

The first thrust bearing 320 can rotatably support the first end 358 of the socket 318 on the drawbar 316 to rotate relative to the drawbar 316. The first thrust bearing 320 can include a rotation axis that extends in the axial direction A. The first thrust bearing 320 can support a load applied to the socket 318 in the axial direction A.

The first thrust bearing 320 can include a first race 362, a second race 364, a first cage 366 and a plurality of first rolling elements 368. The first cage 366 can be an annular disk that includes a plurality of windows. Each of the windows can receive a respective one of the first rolling elements 368 such that first cage 366 spaces each of the first rolling elements 368 away from each other. Each of the first rolling elements 368 can protrude through both sides of the respective window such that each of the first rolling elements 368 engages and rolls along the first and second races 360, 362.

The second thrust bearing 322 can rotatably support the second end 360 of the socket 318 on the drawbar 316 to rotate relative to the drawbar 316. The second thrust bearing 322 can include a rotation axis that extends in the axial direction A. The second thrust bearing 322 can support a load applied to the socket 318 in the axial direction A.

The second thrust bearing 322 can include a third race 370, a fourth race 372, a second cage 374 and a plurality of second rolling elements 376. The second cage 374 can be an annular disk that includes a plurality of windows. Each of the windows can receive a respective one of the second rolling elements 376 such that second cage 374 spaces each of the second rolling elements 376 away from each other. Each of the second rolling elements 376 can protrude through both sides of the respective window such that each of the second rolling elements 376 engages and rolls along the third and fourth races 370, 372.

The socket 318 can further include a first radial face 378 at the first end 358 and a second radial face 380 at the second end 360. The first thrust bearing 320 can abut the first radial face 378. The second thrust bearing 322 can abut the second radial face 380. The second thrust bearing 322 can also abut a radial face 382 of the flange 350 of the drawbar 316.

The first and second thrust bearings 320, 322 can permit the drawbar 316 to move in the axial direction A without additional guiding structure such as but not limited to, splines on the drawbar 316 that engage splines on the support 314. Further, the thrust bearings 320, 322 can rotatably support the socket 318 on the drawbar 316 without radial bearings or tapered bearings rotatably supporting the socket 318 on the drawbar 316. As a result, the surfaces of the second outer circumferential portion 354 and the second inner circumferential portion 342 can be smooth surfaces. Thus, the cost and complexity of the collet clamp assembly can be reduced.

The first and second thrust bearings 320, 322 can be configured as needle roller bearings.

Referring to FIGS. 4-6, the threaded screw actuator mechanism 313 can further include a lock nut 382 and a set screw 384. The lock nut 382 can be threaded onto external threads 386 on the first outer circumferential portion 352 of the main body 348 of the drawbar 316. The lock nut 382 can abut the first thrust bearing 322. The set screw 384 can be threaded into the lock nut 382 and an abut the main body 348 of the drawbar 316. The threaded connection between the lock nut 382 and the drawbar 316 along with the set screw 384 tightened against the drawbar 316 can firmly hold the socket 318 against the first and second thrust bearings 320, 322.

The collet clamp assembly 116 can further include a cover 387. The cover 387 can be secured to and mounted on the second cylindrical portion 338 of the support 314 such that the cover 387 and second cylindrical portion 338 sandwich the flange 328 of the arbor 310. Thus, the cover 387 and the support 314 can prevent the arbor from moving in the axial direction A as the drawbar 316 and the collet 312 move in the axial direction.

The cover assembly can include a central opening 394. The arbor 310 and the collet 312 pass through the central opening 394 such that the outer surface 32 of the arbor 310 and the inner surface 326 and the gripping surface 332 are spaced away from the cover 387.

Referring to FIGS. 3-6, the collet clamp assembly 116 can further include a plurality of first bolts 388, a plurality of second bolts 390 and a plurality of sleeves 392.

The first bolts 388 can pass through the cover 387 and the second cylindrical portion 338 of the support 313, and can be threaded into a respective one of the mounting holes 126 in the mounting surface 120 of the workpiece pallet 100. Thus, the collet clamp assembly 116 can be removable secured to the workpiece pallet 100.

Referring to FIGS. 3, 5 and 6, the second bolts 390 can pass through the flange 331 of the collet 312 and can be threaded into the flange 350 of the drawbar 316. Thus, the collet 312 can be secured to the drawbar 316.

The arbor 310 can include a plurality of bores that slidably receive the sleeves 392. Each of the sleeves 392 can includes a first end that abuts the flange 331 of the collet 312 and second end that abuts the flange 350 of the drawbar 316 such that the sleeves 392 space the drawbar 316 from the collet flange 331 in the axial direction A by a predetermined distance. The predetermined distance can be greater than a flange thickness of the arbor flange 328.

Since the support 314 is bolted to the workpiece pallet 100 by the first bolts 388, the support 314 cannot rotate relative to the workpiece pallet 100. Further, the sleeves 392 and the second bolts pass through the support 314. Thus, the collet 312 and the drawbar 316 are also non-rotatably fixed to the workpiece pallet 100.

When socket 318 is rotated relative to the support 314, the threads 344, 356 cause the socket to advance or retreat in the axial direction A. Since the drawbar 316 is restrained against rotational motion, the drawbar 316 also advances and retreats in the axial direction A together with the socket 318 while the thrust bearings 320, 322 rotatably support the socket 318 on the drawbar 316. Thus, the drawbar 316 can displace the collet 312 between the clamped position shown in FIG. 7 and the released position shown in FIG. 8 by a distance D shown in FIG. 8. That is, the end 333 of the collet 312 is spaced away from the end 330 of the arbor 310 by the distance D when the collet 312 is in the released position, and the ends are substantially coplanar when the collet 312 is in the clamped position.

The pitch of the threads 344, 356 can be set such that precise control of the amount by which the collet 312 is displaced in the axial direction can be achieved. For example, the smaller the thread pitch, the less the socket 318 moves in the axial direction A for each full rotation of the socket 318. Thus, the collet clamp assembly 116 can enhance the precision by which the collet 312 is displaced in the axial direction A.

III. Alternative Embodiments

While certain embodiments of the invention are described above, it should be understood that the invention can be embodied and configured in many different ways without departing from the spirit and scope of the invention.

For example, embodiments are disclosed above in the context of a cylindrical collet clamp assembly 116. However, exemplary embodiments can include any appropriate outer shape for each component of the collet clamp assembly. For example, the collet clamp assemblies 116 shown in FIG. 1 include a cover and a portion of the support that have an oval-shaped outer perimeter. It should be understood that this shape can be of different geometric shapes, including non-symmetrical, symmetrical, circular, rectangular, or other shapes.

Exemplary embodiments are intended to include or otherwise cover any type of drive structure for rotating the socket 318. For example, instead of an external hexagonal surface, the hex drive can be an internal hexagonal surface. Star drives and other known drives can also be used as a drive structure.

What is claimed is:

1. An expanding collet device for selectively clamping a workpiece to a workpiece support, the expanding collet device comprising:

an arbor configured to be fixed to the workpiece support, the arbor includes an outer surface;

a collet located adjacent the outer surface of the arbor and movable relative to the outer surface of the arbor in an axial direction between a released position and a clamped position such that the collet expands in a radial direction perpendicular to the axial direction when the collet moves toward the clamped position and the collet contracts in the radial direction when the collet moves toward the released position; and a threaded screw actuator mechanism including:
- a support fixed to the arbor, the support includes a hollow passage extending through the support in the axial direction, the hollow passage includes a first inner circumferential portion that includes internal threads and a second inner circumferential portion;
- a drawbar connected to the collet, the drawbar extends into the hollow passage, the drawbar has a first outer circumferential portion and a second outer circumferential portion, and the second outer circumferential portion opposes and is spaced away from the second inner circumferential portion of the support;
- a socket surrounding the first outer circumferential portion of the drawbar and terminating at first and second ends, the socket includes external threads engaging the internal threads on the first inner circumferential portion of the support such that rotation of the socket relative to the support displaces the socket in the axial direction;
- a first thrust bearing rotatably supporting the first end of the socket on the drawbar to permit the socket to rotate relative to the drawbar; and
- a second thrust bearing rotatably supporting the second end of the socket on the drawbar to permit the socket to rotate relative to the drawbar, and
- the socket, support, and drawbar are configured such that rotation of the socket in a first direction relative to the support displaces the drawbar in the axial direction such that the drawbar moves the collet toward the released position and rotation of the socket in a second direction different from the first direction and relative to the support displaces the drawbar in the axial direction such that the drawbar moves the collet toward the clamped position.

2. The expanding collet device according to claim 1, wherein
the drawbar moves in the axial direction without splines connecting the drawbar to the support, and
the socket rotates relative to the drawbar without radial bearings supporting the socket.

3. The expanding collet device according to claim 1, wherein the first inner circumferential portion is a continuously smooth cylindrical inner surface and the first outer circumferential portion is a continuously smooth cylindrical outer surface that is concentric with the cylindrical inner surface.

4. The expanding collet device according to claim 1, wherein the socket and drawbar are configured such that they move together along the axial direction of the drawbar.

5. The expanding collet device according to claim 1, wherein the drawbar includes a main body and a flange, the main body includes the first outer circumferential portion and the flange includes the second outer circumferential portion.

6. The expanding collet device according to claim 5, wherein the threaded screw actuator mechanism further includes a lock nut threaded onto first outer circumferential portion of the main body of the drawbar.

7. The expanding collet device according to claim 6, wherein the first end of the socket includes a first radial face, and the first thrust bearing abuts each of the first radial face and the lock nut.

8. The expanding collet device according to claim 5, wherein the second end of the socket includes a second radial face, and the second thrust bearing abuts each of the second radial face and the flange of the drawbar.

9. The expanding collet device according to claim 1, wherein the threaded screw actuator mechanism further includes a set screw that is threaded into the lock nut and abuts the drawbar.

10. The expanding collet device according to claim 1, wherein
the arbor further includes an arbor flange and the collet includes a collet flange, the arbor flange has a flange thickness in the axial direction, and
the expanding collet device further comprises:
- a plurality of bolts passing through a respective one or more of the collet flange and the arbor flange and threaded to a flange located on the drawbar; and
- a plurality of sleeves passing through the arbor flange, each of the sleeves surrounds a respective one of the bolts, each of the sleeves includes a first end that abuts the collet and a second end that abuts the flange on the drawbar such that the sleeves space the drawbar from the collet flange in the axial direction by a predetermined distance that is greater than the flange thickness of the arbor.

11. The expanding collet device according to claim 1, wherein each of the first and second thrust bearings is a needle roller thrust bearings.

12. A collet clamp assembly comprising:
an arbor configured to be fixed to a workpiece support, the arbor includes an outer surface;
a collet located adjacent the outer surface of the arbor and configured to move relative to the outer surface of the arbor in an axial direction between a released position and a clamped position such that the collet expands in a radial direction perpendicular to the axial direction when the collet moves toward the clamped position and the collet contracts in the radial direction when the collet moves toward the released position; and
a threaded screw actuator mechanism including:
- a support fixed to the arbor, the support includes a hollow passage extending through the support in the axial direction, the hollow passage includes a first inner circumferential portion that includes internal threads and a second inner circumferential portion that is a smooth cylindrical inner surface;
- a drawbar connected to the collet, the drawbar extends into the hollow passage, the drawbar has a first outer circumferential portion and a second outer circumferential portion, and the second outer circumferential portion is a smooth cylindrical outer surface that opposes the smooth cylindrical inner surface of the second inner circumferential portion of the support;
- a socket surrounding the first outer circumferential portion of the drawbar and terminating at first and second ends, the socket includes external threads engaging the internal threads on the first inner circumferential portion of the support such that rotation of the socket relative to the support displaces the socket in the axial direction;
- a first thrust bearing rotatably supporting the first end of the socket on the drawbar to allow the socket to rotate relative to the drawbar; and
- a second thrust bearing rotatably supporting the second end of the socket on the drawbar to allow the socket to rotate relative to the drawbar, and
- the socket, support, and drawbar are configured such that rotation of the socket in a first direction relative to the support displaces the drawbar in the axial direction such that the drawbar moves the collet toward the released position and rotation of the socket in a second direction different from the first direction and relative to the support displaces the drawbar in the axial direction such that the drawbar moves the collet toward the clamped position.

13. The collet clamp assembly according to claim 12, wherein the socket and drawbar are configured such that they move together along the axial direction of the drawbar.

14. The collet clamp assembly according to claim 12, wherein the drawbar includes a main body and a flange, the main body includes the first outer circumferential portion and the flange includes the second outer circumferential portion.

15. The collet clamp assembly according to claim 14, wherein the threaded screw actuator mechanism further includes a lock nut threaded onto the first outer circumferential portion of the main body of the drawbar.

16. The expanding collet device according to claim 15, wherein the first end of the socket includes a first radial face, and the first thrust bearing abuts each of the first radial face and the lock nut.

17. The collet clamp assembly according to claim 14, wherein the second end of the socket includes a second radial face, and the second thrust bearing abuts each of the second radial face and the flange of the drawbar.

18. A pallet assembly for removably securing a workpiece, the pallet assembly comprising:
a workpiece pallet including a mounting surface, at least one recess, and at least one mounting hole adjacent to the recess; and
at least one collet clamp assembly configured to selectively clamp a workpiece to the workpiece pallet, the collet clamp assembly including:
an arbor connected to the workpiece pallet, and including an outer surface;
a collet located adjacent on the outer surface of the arbor and movable relative to the outer surface of the arbor in an axial direction between a released position and a clamped position such that the collet expands in a radial direction perpendicular to the axial direction when the collet moves toward the clamped position and the collet contracts in the radial direction when the collet moves toward the released position; and
a threaded screw actuator mechanism extending into recess and including:
a support fixed to the arbor, the support includes a hollow passage extending through the support in the axial direction, the hollow passage includes a first inner circumferential portion that includes internal threads and a second inner circumferential portion;
a drawbar connected to the collet, the drawbar extends into the hollow passage, the drawbar has a first outer circumferential portion and a second outer circumferential portion, and the second outer circumferential portion opposes and is spaced away from the second inner circumferential portion of the support;
a socket surrounding the first outer circumferential portion of the drawbar and terminating at first and second ends, the socket includes external threads engaging the internal threads on the first inner circumferential portion of the support such that rotation of the socket relative to the support displaces the socket in the axial direction;
a first thrust bearing rotatably supporting the first end of the socket on the drawbar to allow the socket to rotate relative to the drawbar; and
a second thrust bearing rotatably supporting the second end of the socket on the drawbar to allow the socket to rotate relative to the drawbar, and
the socket, support, and drawbar are configured such that rotation of the socket in a first direction relative to the support displaces the drawbar in the axial direction such that the drawbar moves the collet toward the released position and rotation of the socket in a second direction different from the first direction and relative to the support displaces the drawbar in the axial direction such that the drawbar moves the collet toward the clamped position.

19. The pallet assembly according to claim 18, wherein the support includes a first portion that extends into the recess and a second portion that extends across the mounting surface of the workpiece pallet, the second portion includes a support mounting hole that is aligned with the mounting hole in the workpiece pallet, and the pallet assembly further comprises at least one bolt passing through the support mounting hole and threaded into the mounting hole in the workpiece pallet.

20. The pallet assembly according to claim 18, further comprising:
a cover including a central opening; and
a bolt,
the arbor and the collet extend through central opening, the arbor includes an arbor flange, and the cover abuts the arbor flange,
the support includes a first cylindrical portion that extends into the recess in the workpiece pallet and a second cylindrical portion that abuts the cover, the second cylindrical portion abuts the mounting surface of the workpiece pallet, the arbor flange is located within and abuts the second cylindrical portion, and the arbor flange is sandwiched between the cover and the first cylindrical portion, and
the bolt passes through the cover and the second cylindrical portion of the support.

* * * * *